US006233247B1

(12) United States Patent
Alami et al.

(10) Patent No.: US 6,233,247 B1
(45) Date of Patent: May 15, 2001

(54) METHOD AND SYSTEM FOR AVOIDING COMMUNICATION FAILURE IN CDMA SYSTEMS

(75) Inventors: Samir Alami, Denton; Kim Chang, Richardson, both of TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/041,148

(22) Filed: Mar. 12, 1998

(51) Int. Cl.[7] .................................................. H04J 13/00
(52) U.S. Cl. ......................... 370/441; 370/242; 370/320; 370/341; 370/342; 370/479
(58) Field of Search .................................... 370/209, 242, 370/320, 332, 335, 341, 342, 349, 441, 491, 479

(56) References Cited

U.S. PATENT DOCUMENTS

| | | | |
|---|---|---|---|
| 5,570,349 | * 10/1996 | Bustamante et al. | 370/209 |
| 5,577,022 | * 11/1996 | Padovani et al. | 370/332 |
| 5,577,025 | 11/1996 | Skinner et al. . | |
| 5,606,548 | 2/1997 | Vayrynen et al. . | |
| 5,644,591 | * 7/1997 | Sutton | 370/342 |
| 5,828,957 | * 10/1998 | Kroeger et al. | 370/320 |
| 5,909,437 | * 6/1999 | Rhodes et al. | 370/349 |

FOREIGN PATENT DOCUMENTS 0714217  5/1996  (EP) .
2691027  5/1993  (FR) .

* cited by examiner

Primary Examiner—Dang Ton
Assistant Examiner—Shick Hom
(74) Attorney, Agent, or Firm—John D. Crane; Bracewell & Patterson, L.L.P.

(57) ABSTRACT

A method and system for avoiding communication failure in CDMA systems. The method system achieve their objects as follows. At least one CDMA carrier acquisition failure is detected. Channel acquisition procedures are adjusted such that the at least one CDMA carrier for which acquisition failed is no longer considered a viable channel. Channel acquisition failure detection can include storing the identity of the at least one CDMA carrier for which acquisition failed. Adjustment of channel acquisition procedures can include removing the at least one CDMA carrier for which acquisition failed from the list of carriers considered active. Adjustment of channel acquisition procedures can also include allowing CDMA carrier selection as if the detection of at least one CDMA carrier acquisition failure had not occurred, and, if the CDMA carrier selected is the at least one CDMA carrier for which acquisition failed, substituting another CDMA carrier in place of the CDMA carrier selected. Furthermore, adjustment of channel acquisition procedures can also include substituting a new seed into the pseudo-random number generator ordinarily utilized to select the CDMA carrier, and thereafter utilizing the new seed with the pseudo-random number generator ordinarily utilized to select the CDMA carrier.

14 Claims, 4 Drawing Sheets

METHOD AND SYSTEM FOR AVOIDING COMMUNICATION FAILURE IN CDMA SYSTEMS

Cross-Reference To Related Patent Applications

The present invention is related to the subject matter of the provisional United States Patent Application entitled "Selection of Alternate Frequency in CDMA System for Multiple Frequencies in One Cell," filed Apr. 14 1997, Ser. No. 60/043,546 (Northern Telecom Incorporated Docket No. RR-2163P), assigned to the assignee herein named. Applicants hereby claim the benefit under 35 U.S.C. § 119(e) of this foregoing related provisional application. The contents of the above-mentioned provisional patent application is incorporated by reference herein.

Background of the Invention

1. Technical Field

The present invention relates, in general, to a method and system to be utilized with wireless communications systems having cellular architectures. In particular, the present invention relates to a method and system, to be utilized with wireless communications systems having cellular architectures which utilize Code Division Multiple Access (CDMA). Yet still more particularly, the present invention relates to a method and system, to be utilized with wireless communications systems having cellular architectures which utilize CDMA, and which increase the reliability of such wireless communications systems by avoiding communication failure.

2. Description of the Related Art

The present invention is related to wireless communication systems, and, in particular, to wireless communications systems which have both a cellular architecture (e.g., cellular telephony, personal communications systems) and which utilize CDMA (or similar technologies). Wireless communication refers to the fact that transmission between sending and receiving stations occurs via electromagnetic radiation not guided by any hard physical path (e.g. by microwave link). Cellular architecture refers to the fact that the wireless system effects service over an area by utilizing a system that can be (ideally) be pictographically represented as a cellular grid. CDMA stands for Code Division Multiple Access, which is a type of spread spectrum technology, originally developed for military application and thereafter adapted for civilian use.

Wireless cellular communication utilizing CDMA is the latest incarnation of a technology that was originally known as mobile telephone systems. Early mobile telephone system architecture was structured similar to television broadcasting. That is, one very powerful transmitter located at the highest spot in an area would broadcast in a very large radius. If a user were in the usable radius, then that user could broadcast to the base station and communicate by radio telephone to the base station. However, such systems proved to be very expensive for the users and not very profitable to the communication companies supplying such services. The primary limiting factor of the original mobile telephone systems was that the number of channels available for use was limited due to severe channel-to-channel interference within the area served by the powerful transmitter.

Counter-intuitively, engineers discovered that channel-to-channel interference effects within the service area were not related solely to the distance between stations communicating with a base station transmitter (which intuitively would seem to give rise to the interference), but were also related inversely to the usable radius of the roughly circular area being served by a base station transmitter. Engineers found that by reducing the radius of an area being served by a base station transmitter by a significant percentage, channel-to-channel interference effects were reduced such that a significant increase in the number of additional usable channels could be provided. For example, it was found that a system based on an area being served by a base station transmitter with a one-kilometer useable radius would have 100 times more usable channels than a system based on an area being served by a base station transmitter with a 10-kilometer useable radius.

Reducing the power of the central transmitter allowed a significant increase in the number of available channels by reducing channel-to-channel interference within an area. However, as the power of the central transmitter was reduced, the serviceable area was also reduced. Consequently, although reducing transmission power increased the number of available channels, the small service area provided by such reduced power did not make such radio telephone systems attractive communication options for many users. Thus, a problem arose relating to how to utilize the discovery that smaller area size (or, equivalently, reduced transmitter power) increased the available channels such that radio telephone systems based on such smaller areas would be commercially viable.

This problem was solved by the invention of the wireless cellular architecture concept. The wireless cellular architecture concept utilizes geographical subunits called "cells" and encompasses what are known as the "frequency reuse" and "handoff" concepts. A cell is the basic geographic unit of a cellular system. Cells are defined by base stations (a base station consists of hardware located at the defining location of a cell and includes power sources, interface equipment, radio frequency transmitters and receivers, and antenna systems) transmitting over small geographic areas that are represented (ideally) as hexagons. The term "cellular" comes from the honeycomb shape of the areas into which a coverage region, served via two or more base stations, is divided when the mathematically ideal hexagonal shape used to represent the usable geographic area of each of the two or more base stations. It is to be understood that, although the mathematically ideal shape of the cell is a hexagon, in practicality each cell size varies dependent upon the landscape (e.g., a base station transmitting on a flat plane will closely approximate the ideal hexagon, whereas a base station transmitting in a valley surrounded by hills will not closely approximate a hexagon due to the interference from the surrounding hills).

Within each cell a base station controller talks to many mobile subscriber units at once, utilizing one defined transmit/receive communications channel for each mobile subscriber unit with which communication is taking place. Each mobile subscriber unit (a control unit and a transceiver that transmits and receives wireless transmissions to and from a cell site) uses a separate, temporarily assigned transmit/receive wireless channel to talk to a cell site. Each wireless transmit/receive communications channel consists of a pair of frequencies for communication—one frequency for transmitting from the cell site base station controller to the mobile subscriber unit, named the forward link, and one frequency for transmitting from the mobile subscriber unit to the cell site base station controller, named the reverse link.

Wireless communication is regulated by government bodies (e.g., the Federal Communications Commission in the United States). Government bodies dictate what frequencies in the wireless spectrum can be used for particular applications. Consequently, there is a finite set of frequencies available for use with cellular communications. The frequency reuse concept is based on the assigning to each cell a group of radio channels to be used within the small geographic area (cell). Adjacent cells are assigned groups of channels that are completely different from the groups of channels assigned to neighboring cells. Thus, in the frequency reuse concept there is always a buffer cell between two cells utilizing the same set of frequencies. The cells are sized such that it is not likely that two cells utilizing the same set of frequencies will interfere with each other. Thus, such a scheme allows "frequency reuse" by non-adjacent cells. As mobile subscriber units transit adjacent cells, the mobile subscriber unit is "handed" from a cell it is leaving into a cell it is entering by directing the mobile subscriber unit to stop using frequencies appropriate to the cell it is leaving and to begin using frequencies appropriate to the cell it is entering. Thus, the cellular architecture concept, in conjunction with the frequency reuse concept, augmented by the operation of "hand-off" gave rise to the ability to utilize small cells to provide communications service over a large geographic area.

The first large-scale wireless communications system utilizing cellular architecture in North America was the Advanced Mobile Phone Service (AMPS) which was released in 1983. With the introduction of AMPS, user demand for bandwidth was initially low until users became acquainted with the power of the system. However, once users became acquainted with the power of cellular, the demand for the service increased. Very quickly, even the extended number of channels available utilizing the cellular concepts of reduced power output and frequency reuse were quickly consumed by user demand in certain geographic areas, and a problem arose with respect to capacity.

Engineers responded to the problem by devising the Narrowband Analog Mobile Phone Service (NAMPS). NAMPS utilizes frequency division multiplexing to transmit three transmit/receive channels in the same bandwidth wherein AMPS had previously only transmitted one transmit/receive channel. Thus, NAMPS essentially tripled the capacity of AMPS. However, even though NAMPS essentially tripled the capacity of AMPS, the extended number of channels available with NAMPS were quickly consumed by user demand in certain geographic areas, and a problem again arose with respect to capacity.

Engineers responded to this new problem by devising Digital AMPS (or DAMPS, also known as TDMA). In DAMPS/TDMA time division multiple access techniques are utilized to multiplex user data together. Furthermore, digital data compression techniques are utilized at both the transmission and reception ends. These techniques give rise to increased capacity, and clarity, even exceeding that of NAMPS. However, as was the case with both AMPS and NAMPS, the increased bandwidth capacity of DAMPS/TDMA has been quickly consumed by user demand in certain geographic areas.

Subsequent attempts to increase cellular telephony bandwidth capacity tended to be variations on the foregoing described themes. However, it became apparent that some new communications technology would be necessary to give rise to any significant increase in bandwidth beyond that available with the foregoing described technologies. It was decided within the industry that such new technology would be standard CDMA, which stands for Code Division Multiple Access.

Notice that in all the foregoing described technologies, the method of using multiple transmit/receive channels with each such transmit/receive channel utilizing a different pair of frequencies was maintained throughout. Standard CDMA breaks completely with this method of communication.

Standard CDMA utilizes cellular architecture and a type of hand-off. However, in standard CDMA, transmission and reception is done by all users on the same frequency. Standard CDMA is able to achieve this feat by insuring that the signals from different users are adjusted such that the signals do not interfere with each other to the point of being unable to understand the messages from the different users.

The way in which standard CDMA works is somewhat analogous to a situation in which two English speaking persons are communicating in a room wherein many other non-English speakers are also communicating in a language which the two English speakers do not understand. Since the two English speakers do not understand the language spoken by the non-English speakers in the room, the conversations of their non-English-speaking counterparts will be interpreted by the two English speakers as meaningless "noise." Consequently, since the English speakers will attach no meaning to the "noise," the English speakers will be able to disregard the "noise" and continue to engage in their conversation provided that they both speak loudly enough so that each can be understood by the other despite the "noise" generated by their non-English-speaking counterparts. This is true even though all persons in the room are talking, or communicating, in the same band of sound frequencies which the human ear can hear.

Standard CDMA is able to achieve the same affect by modulating the signal of each user within a particular cell with a "pseudo-noise" code which, in effect, will make each user in the cell appear as if each user were, in effect, "speaking a different language," thereby insuring that the meaning of a signal generated by one user within the cell will not be drowned out by the meaning contained within the signal generated by one or more other users in the cell. Provided, of course, that each user speaks "loudly" enough (or transmits enough power) to be understood over the "noise" generated by the other users in the CDMA cell.

Standard CDMA utilizes digital data technology to achieve the foregoing. Standard CDMA utilizes complex digital codes to modulate user data prior to transmission within a cell. The standard CDMA pseudo-noise codes are chosen such that a modulated signal, when transmitted upon a carrier frequency within the cell, approximates white (or Gaussian) noise, and does not greatly interfere with any other signal transmitted upon the same carrier frequency within the cell. Upon reception, a similar pseudo-noise code is used to demodulate the signal and recover the data that was transmitted.

When digital data technology is utilized with the standard CDMA pseudo-noise codes, it is necessary for all transmitters and receivers within a cell to be synchronized to the same digital clock. This synchronization is provided by use of a "pilot" signal which is transmitted by the base station. Each mobile subscriber unit within a cell "locks" to this pilot signal and thereafter utilizes it as the clock signal for digital data-processing.

In standard CDMA, each base station transmits and receives on the same carrier frequency. Furthermore, in standard CDMA, each base station transmits the same period digital code which is utilized as the pilot signal within each cell. ordinarily, such a situation would give rise to severe interference between cells. Standard CDMA avoids this problem by phase-shifting (or time-staggering) the pilot signal, or digital code, transmitted within adjacent cells.

Within standard CDMA, the carrier signal, pilot code, pseudo-noise codes, and phase-shifting (or time-staggering) of the pilot codes utilized in adjacent cells have all been chosen to work together such that inter-cell interference is minimized. Thus, not only does standard CDMA ensure that users in each cell appear to each other as if they are "speaking different languages," but standard CDMA ensures that adjacent cells appear to each other "as if" each cell was in fact "speaking a different language."

Although at first examination, it appears that standard CDMA can provide virtually unlimited bandwidth, in actuality standard CDMA has provided an increase in capacity of only roughly 13 times that of AMPS. The primary reason for this is known in the art as "the near-far" problem. Returning to our analogy of two English speakers communicating in a room full of other nonEnglish speakers, it is apparent that there is a practical limit with respect to how far apart the English speakers can be and still communicate. That is, due to the "noise" produced by the non-English-speaking persons in the room, there is a practical limit on how far apart the English speakers can be and still be understood by each other. This practical limit is dependent upon both the "noise" in the room and the "volume" which can be generated by each English speaker. That is, when the English speakers are "near" each other, they can communicate with relatively low "volume" (or "power" output), but when they are "far" from each other they can only communicate with relatively high "volume" (or "power" output).

A similar "near-far" problem exists in standard CDMA for roughly the same reasons. That is, the "noise" of the other users in a cell gives rise to a requirement that the mobile subscriber units in the cell increase their power outputs dependent upon both noise in the cell and the distance from the base station transceiver. This "near-far" problem thus puts a practical limit on the bandwidth available in standard CDMA, which has been found empirically to have a practical upper limit of 13 times AMPS.

As was the case for original cellular, AMPS, and DAMPS/TDMA, the additional bandwidth provided by standard CDMA is being quickly consumed by users. Consequently, newer CDMA systems are being developed to provide users with additional bandwidth. However, as will be shown in the detailed description, such newer systems, in certain instances, tend toward communication failure. It is therefore apparent that a need exists for a method and system which increase the reliability of such wireless communications systems by avoiding communication failure in the instances identified.

SUMMARY OF THE INVENTION

It is therefore one object of the present invention to provide a method and system to be utilized with wireless communications systems having cellular architectures.

It is therefore another object of the present invention to provide a method and system, to be utilized with wireless communications systems having cellular architectures and which utilize CDMA.

It is yet another object of the present invention to provide a method and system, to be utilized with wireless communications systems having cellular architectures and which utilize CDMA, and which increase the reliability of such wireless communications systems by avoiding communication failure.

The method and system achieve their objects as follows. At least one CDMA carrier acquisition failure is detected. Channel acquisition procedures are adjusted such that the at least one CDMA carrier for which acquisition failed is no longer considered a viable channel. Channel acquisition failure detection can include storing the identity of the at least one CDMA carrier for which acquisition failed. Adjustment of channel acquisition procedures can include removing the at least one CDMA carrier for which acquisition failed from the list of carriers considered active. Adjustment of channel acquisition procedures can also include allowing CDMA carrier selection as if the detection of at least one CDMA carrier acquisition failure had not occurred, and, if the CDMA carrier selected is the at least one CDMA carrier for which acquisition failed, substituting another CDMA carrier in place of the CDMA carrier selected. Furthermore, adjustment of channel acquisition procedures can also include substituting a new seed into the pseudo-random number generator ordinarily utilized to select the CDMA carrier, and thereafter utilizing the new seed with the pseudo-random number generator ordinarily utilized to select the CDMA carrier.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

As was noted in the background section, the additional bandwidth provided by standard CDMA is currently being consumed by users. Consequently, a desire has arisen to provide additional bandwidth above and beyond that available with standard CDMA.

One attempt at providing such additional bandwidth has focused on providing additional carriers within each cell above and beyond that normally provided by standard CDMA. That is, as was explained in the background, while standard CDMA utilizes only one carrier within each cell, newer experimental systems are being tried which attempt to increase the bandwidth available in each cell by providing, in effect, multiple independent CDMA systems within each individual cell. For ease in differentiation, the newer systems will be referred to herein as "multi-carrier CDMA" to distinguish them from "standard" (one carrier) CDMA.

Figure 1:
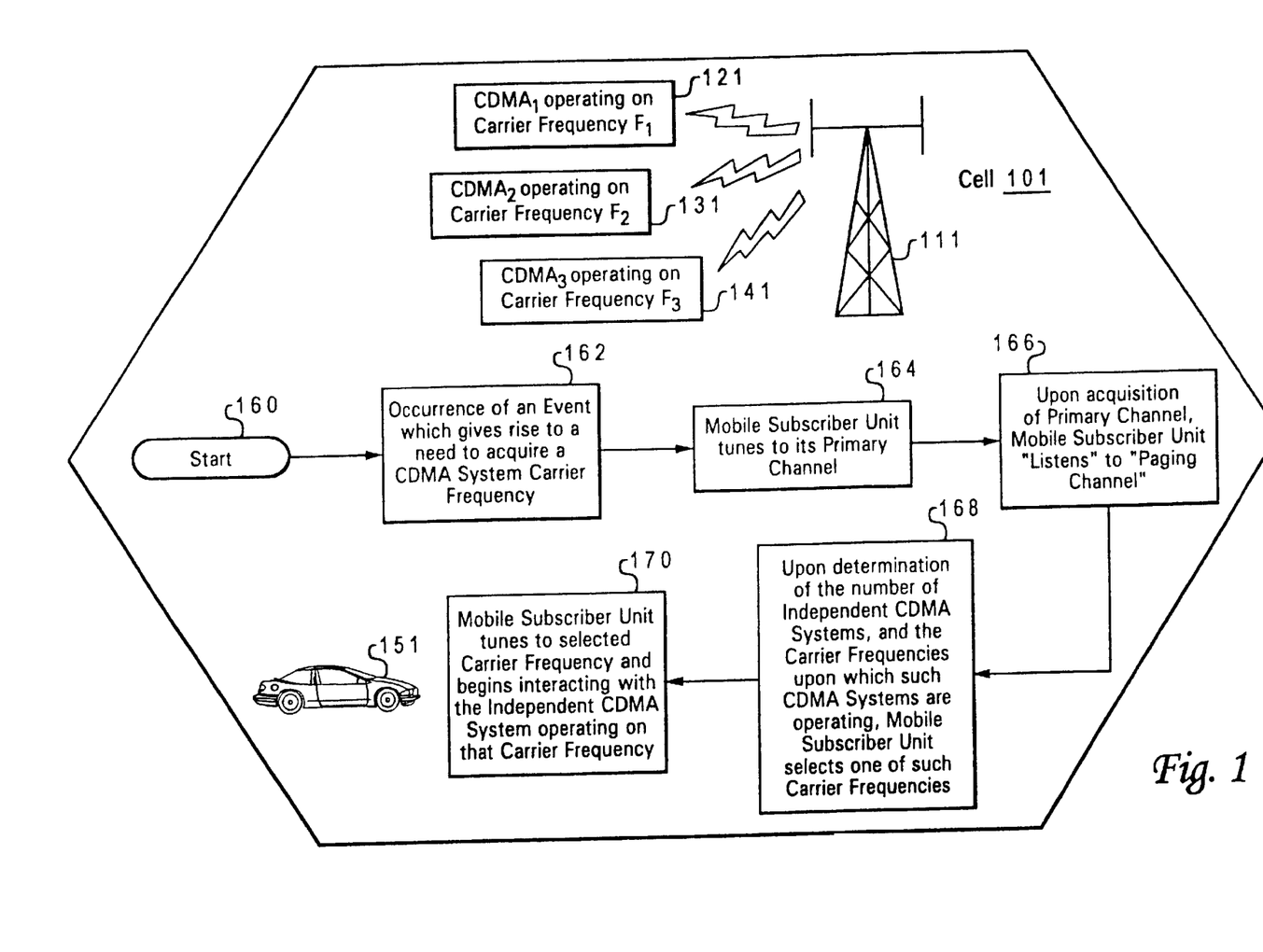
FIG. 1 depicts a multi-carrier CDMA environment wherein one embodiment of the present invention can be practiced.

Such experimental systems are quite complex, in that they attempt to coordinate users across the multiple independent CDMA systems which are required to implement multi-carrier CDMA within an within an individual cell, as well as coordinate user handoff between such multiple independent CDMA systems within adjacent cells. One facet of the way which this is achieved is by having the mobile subscriber units determine, via communication with base station controllers, the carrier frequencies available within a cell and then making the individual mobile subscriber units responsible for selecting one of the available carrier frequencies for use. FIG. 1 shows this operation pictographically.

FIG. 1 depicts a multi-carrier CDMA environment wherein one embodiment of the present invention can be practiced. A "cell" is the basic geographic unit of a cellular system generated by a base station transmitting within a geographic area. The term "cellular" comes from the honeycomb shape of the areas into which a coverage region is divided. Illustrated in FIG. 1 is CDMA cell 101 which is depicted as a honeycomb shape within which base station 111 is shown. Cells are pictographic representations of the effective geographic area of base station (a base station includes but is not limited to transmitters and receivers sufficient to service existing cell channels within a particular cell) transmitters that are for convenience represent as hexagons. Each cell size varies dependent upon the landscape. Because of constraints imposed by natural terrain and man-made structures, the true shape of cells is not a perfect hexagon.

Base station 111 is shown as having a multi-carrier CDMA scheme supporting three separate, and independent, CDMA systems: CDMA_1 system 121 transmitting on carrier frequency F_1; CDMA_2 system 131 transmitting on carrier frequency F_2; and CDMA_3 system 141 transmitting on carrier frequency F_3. Also depicted is mobile subscriber unit 151.

For sake of illustration, it is to be assumed that mobile subscriber unit 151 is being powered-up (i.e., is being turned on) in CDMA cell 101. Upon power-up (i.e., being turned on) it is necessary for mobile subscriber unit 151 to determine which of the three independent CDMA systems it will utilize while it is in CDMA cell 101 that. This is illustrated in a general sense by method flow steps 160–170.

Method step 160 depicts the start of the process. Method step 162 illustrates the event of power-up or any other state where determination of which independent CDMA system will be utilized is necessary (e.g., entering cell 101 upon handoff, or re-acquiring a carrier when one carrier has been lost). Method step 164 shows that mobile subscriber unit 151 tunes to its primary channel (a pre-assigned channel native to mobile subscriber unit 151).

Method step 166 depicts that upon acquisition of the primary channel, mobile subscriber unit 151 listens to what is known as the "paging channel," upon which are carried what are known as overhead messages, and determines how many independent CDMA systems are available in cell 101 and the carrier frequencies upon which such independent CDMA systems are operating.

Method step 168 illustrates that upon determination of the number of independent CDMA systems, and the carrier frequencies upon which the independent CDMA systems are operating, in cell 101, mobile subscriber unit 151 selects one of the carrier frequencies upon which one of the independent CDMA systems is operating. Thereafter, method step 170 shows that mobile subscriber unit 151 tunes to the selected carrier frequency and begins interacting with the independent CDMA system operating on that tuned-to carrier frequency.

Method steps 160–170 have illustrated generally how the independent CDMA system is selected in a multi-carrier (as opposed to standard) CDMA system. However, those skilled in the art will recognize that while the operation is generally as depicted as shown in method steps 160–170, the specific way in which such is done is more complicated.

Figure 2:
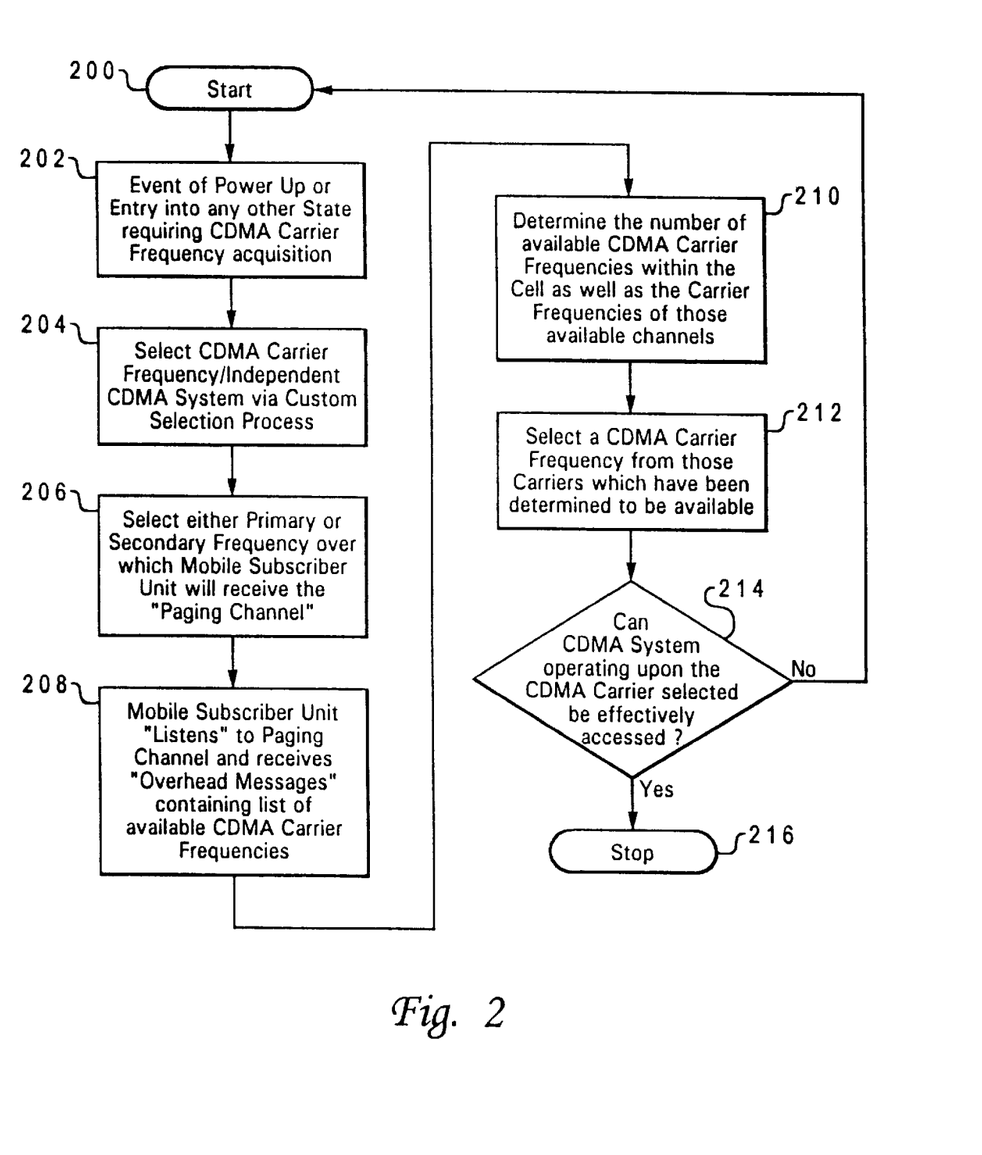
FIG. 2 illustrates as closely as is practicable the way in which an independent CDMA system, from a multi-carrier CDMA environment, is selected and also illustrates a defect in the selection standards which will cause a system failure.

Refer now to FIG. 2. FIG. 2 illustrates as closely as is practicable the way in which an actual independent CDMA system, from a multi-carrier CDMA environment, is selected as dictated by pages 6–97 through 6–123 of the Mobile Station-Base Station Compatibility Standard for Dual-Mode Wideband Spread Spectrum Cellular System+ Telecommunications Systems Bulletin: Support for 14.4 kbps Date Rate and PCS Interaction for Wideband Spread Spectrum Cellular Systems, TIS/EIA/IS-95-A+TSB74 standard (Feb. 27, 1996) (hereinafter referred to as the "IS-95-A+TSB74 standard"); the IS-95-A+TSB74 standard is well-known to those within the art. FIG. 2 will also be used to illustrate a defect in the IS-95-A+TSB74 standard which will cause a system failure.

Method step 200 shows the start of the process. Method step 202 depicts power-up or entry into any other state requiring CDMA channel (or CDMA independent system) acquisition. See IS-95-A+TSB74 page 6–97 for details. Method step 204 illustrates the selection of a CDMA system in accordance with the custom selection process. See IS-95-A+TSB74 page 6–97 for details. Method step 206 shows the selection of either the primary or secondary CDMA channel over which the mobile subscriber unit will receive the "paging channel" (those skilled in the art will recognize that the foregoing is a portion of the Custom System Selection Process, which has many more steps in addition to the foregoing described step; however, for purposes of the present invention selection of the primary or secondary CDMA channel is most relevant). See IS-95-A+TSB74 page 6–101 for details.

Method step 208 depicts the event of a mobile subscriber unit listening to a "paging channel" subsequent to tuning to either the primary or secondary CDMA channel and receiving "overhead messages," one of which is/contains a "CDMA Channel List Message." See IS-95-A+TSB74 pages 6–116 to 6–117 for details. Method step 210 illustrates the extraction and saving of the number (an integer) of and carrier frequencies of the independent CDMA systems/channels available within a cell; those skilled in the art will recognize that each channel will be known by a non-negative integer number, which the mobile subscriber unit will associate internally with a channel operating at a given carrier frequency. See IS-95-A+TSB74 page 6–123 for details.

Method step 212 illustrates the selection of a CDMA system/channel which will be utilized by a mobile subscriber unit. IS-95-A+TSB74 page 6–123; 6–230 to 6–231 for details. Method step 214 shows that subsequent to the selection of a CDMA system/channel (or carrier frequency) a mobile subscriber unit makes an attempt to tune in to the CDMA system/channel (or carrier frequency) selected. IS-95-A+TSB74.

In the event that the mobile subscriber unit is able to tune in to the CDMA system/channel (or carrier frequency) selected, the process proceeds to method step 216 and stops.

In the event that the mobile subscriber unit is unable to tune in to the CDMA system/channel (or carrier frequency)

selected, the process returns to method step 200. Thereafter, the process proceeds through the flow again. Notice that no provision is made in the method shown to "remember" either the fact that channel acquisition failed, or the designation of the channel associated with that failed acquisition. See IS-95-A+TSB74 page 6–230 to 6–231 for details.

The fact that no provision is made in the method shown to "remember" the fact that channel acquisition failed gives rise to severe and significant errors under the IS-95-A+TSB74 standard. This error arises because no provision is made under the IS-95-A+TSB74 standard to remember either the specific channel upon which acquisition failed, and/or utilize the identity of the channel that failed to ensure that an attempt is not made to re-acquire the channel upon which acquisition failed.

While the foregoing example dealt with the IS-95-A+TSB74 standard, those skilled in the art will recognize that there are analogous standards in which similar problems occur. One such standard is the Personal Station-Base Station Compatibility Requirements for 1.8 to 2.0 Ghz Code Division Multiple Access (CDMA) Personal Communications Systems, ANSI J-STD-008 standard (Original Version Mar. 24, 1995; Corrected Version Aug. 29, 1995) (hereinafter the "ANSI J-STD-008 standard"). Accordingly, one embodiment, described in FIG. 3 below, of the present invention solves the above identified problem under the ANSI J-STD-008 standard. A second embodiment of the present invention, described in Figure 4 below, insures that the foregoing identified error does not occur under the IS-95-A+TSB74 standard.

Figure 3:
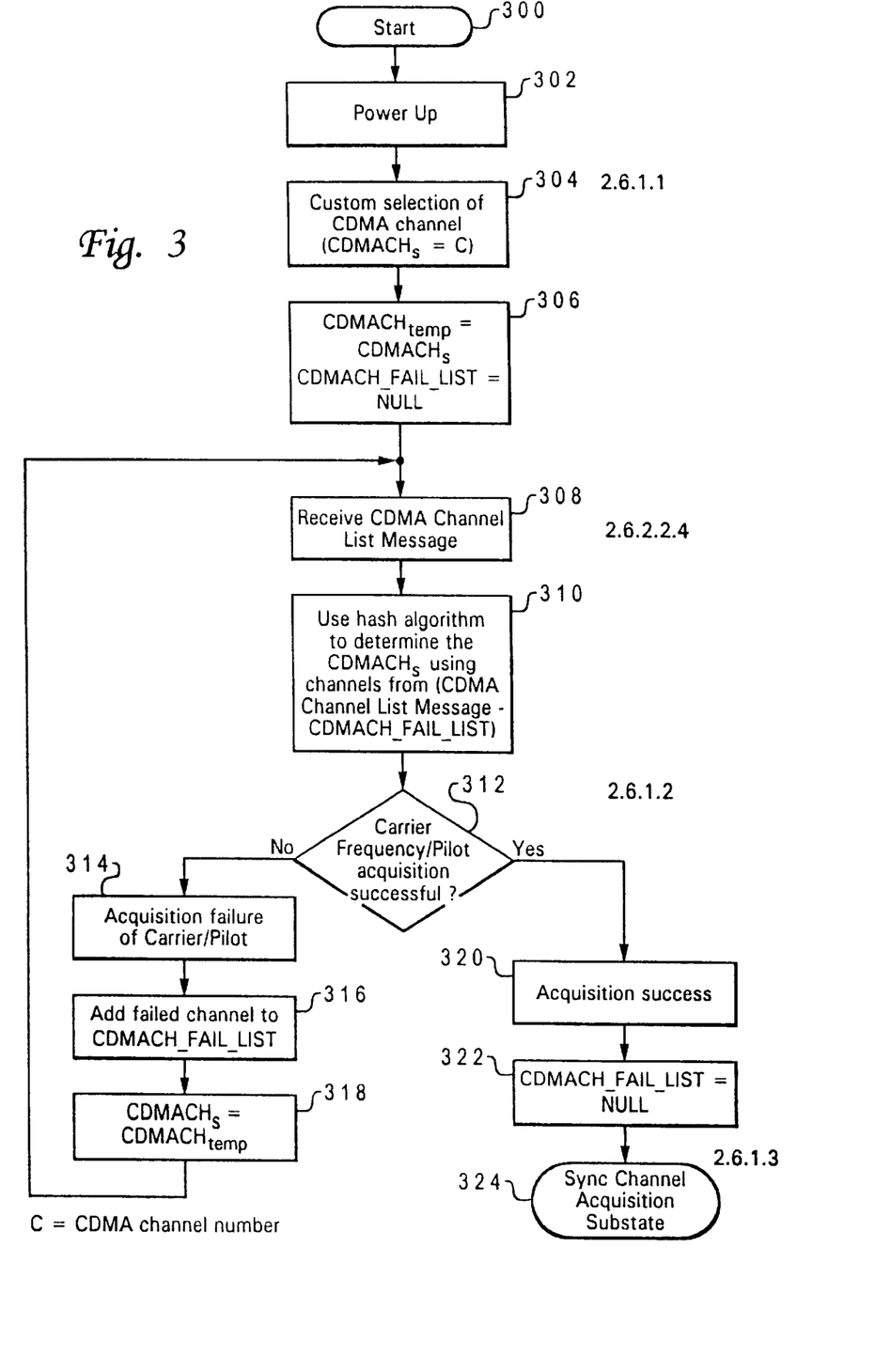
FIG. 3 is a high-level logic flow chart which depicts a method by which an embodiment of the present invention is able to alleviate system failure in an ANSI J-STD-008 standard system.

Refer now to FIG. 3. FIG. 3 is a high-level logic flow chart which depicts a method by which an embodiment of the present invention is able to alleviate. the foregoing described problem. The high-level logic flow chart of FIG. 3 can be referenced specifically to the ANSI J-STD-008 standard via the ANSI J-STD-008 standard section numbers depicted in FIG. 3 (e.g., 2.6.1.1, 2.6.2.2.4, 2.6.1.2, and 2.6.1.3). That is, the high-level logic flow chart depicted in FIG. 3 is intended to be used within the context of ANSI J-STD-008 systems to alleviate the foregoing noted problems extant within the standard itself.

Method step 300 illustrates the start of the process. Method step 302 shows the event of "power up," such as the event of a mobile subscriber unit being turned on. Method step 304 depicts the mobile subscriber unit engaging in the ANSI J-STD-008 "custom selection" process in order to find and tune to an available CDMA primary or secondary channel in a fashion dictated by ANSI J-STD-008 standard section 2.6.1.1, which is shown as CDMACHs being set equal to "C," which represents the mobile subscriber unit being tuned to either its primary or secondary channel.

Method step 306 depicts the default initialization of parameters to be utilized by the process to ensure that any CDMA carrier frequency selected is in fact one that is operational; that is, method step 306 depicts the initialization of the variables $CDMACH_{TEMP}$ (which is used to hold the value of the primary or secondary channel, "C," for reasons explained below) and $CDMACH_s$ to default channel "C" (which was introduced in method step 304), and CDMACH_FAIL_LIST to default value NULL (which merely means that the list of failed CDMA carrier frequencies is empty at initialization).

Method step 308 illustrates the receipt of a CDMA carrier frequency (or "channel list") list message in a fashion dictated by ANSI J-STD-008 standard section 2.6.2.2.4. Method step 310 shows that upon receipt of the CDMA carrier frequency list a modified ANSI J-STD-008 hash algorithm is utilized to select a CDMA carrier frequency; shown in method step 310 is that the selection is done by selecting the CDMA carrier frequency from the CDMA carrier frequencies indicated in the received CDMA channel list message minus the CDMA carrier frequencies (if any) contained within CDMACH_FAIL_LIST (that is, the list of failed CDMA carrier frequencies). Those skilled in the art will recognize that there are numerous ways in which the ANSI J-STD-008 hash algorithm can be modified such that the foregoing is achieved, with such ways including, but not limited to, (1) subtracting out the failed CDMA carriers prior to initializing the ANSI JSTD-008 hash algorithm; (2) allowing the ANSI J-STD-008 hash algorithm to operate "as if" the failed CDMA carrier frequencies had not been noted, and in the event that a failed frequency (i.e., a channel contained within CDMACH_FAIL_LIST) is selected, then substituting for that failed frequency an operative frequency (i.e., a carrier frequency which is within the received CDMA channel list, but which is not contained within CDMACH_FAIL_LIST); or (3) substituting a new seed, other than that associated with any failed carrier frequencies contained within the list of failed carrier frequencies CDMACH_FAIL_LIST, into the pseudo-random number generator ordinarily utilized under the ANSI J-STD-008 standard to select a CDMA carrier frequency.

Method step 312 depicts that subsequent to the selection of a CDMA carrier frequency, an attempt is made to first acquire the selected carrier frequency and then. the "pilot" channel being broadcast within selected CDMA frequency (if the selected carrier frequency has been successfully acquired) in the fashion dictated by ANSI J-STD-008 standard section 2.6.1. In the event that either attempt is unsuccessful the process proceeds to method step 314 wherein it is illustrated that the acquisition failure (arising either from the inability to acquire the carrier or the inability to acquire the pilot) is noted. Thereafter, method step 316 shows that the CDMA carrier frequency wherein pilot acquisition failed is added to the list of failed channels contained within CDMACH_FAIL_LIST.

Those skilled in the art will appreciate that in the custom selection process depicted in method step 304 the mobile subscriber unit's receiver is tuned to either the primary or secondary channel in order to subsequently receive the CDMA channel list message. However, those skilled in the art will also realize that $CDMACH_s$ (i.e., the frequency at which the mobile subscriber unit's receiver is tuned) was reset in method stop 310 to the channel upon which acquisition has failed. Since the flow of the process depicted in FIG. 3 re-enters the flowchart at a point in the flow below method step 304 (i.e., where $CDMACH_s$ is set to either the primary or secondary channel "C"), it is necessary that a mechanism exist to reset the $CDMACH_s$ to channel "C." Method step 318 illustrates that this mechanism is provided by the variable $CDMACH_{TEMP}$ wherein was stored the channel "C" in method step 306; thus, $CDMACH_s$ can be thereafter utilized as normal since subsequent to method step 318 $CDMACH_s$ will be reset to the value of channel "C." Thereafter, the process proceeds to method step 308 and proceeds as is shown in the flow chart with it being understood that the variables subsequently used in the flow will be those necessary to modify the ANSI J-STD-008 hash algorithm in the manner chosen by the system designer.

In the event that the attempt to acquire the selected carrier frequency/"pilot" channel as illustrated in method step 312 was successful, the process proceeds to method step 320 wherein it is depicted that the successful acquisition of the pilot channel is noted. Thereafter, the process proceeds to method step 322 wherein it is shown that the list of failed CDMA carrier frequencies is reset to be empty (that is, since it is possible that what was previously noted as a failed CDMA carrier frequency may in fact become an operative carrier frequency at some subsequent time, the list of failed CDMA carrier frequencies is reset to empty upon every successful CDMA carrier frequency/"pilot" channel acquisition). Thereafter, the process proceeds to 324 wherein the mobile subscriber unit enters into the "Sync Channel Acquisition Substate" as defined by ANSI J-STD-008 standard section 2.6.1.3.

It will be understood by those within the art that the process illustrated in FIG. 3 is to be re-engaged in each time the mobile subscriber unit leaves the "Sync Channel Acquisition Substate" and enters into a state wherein it is necessary to acquire a new CDMA carrier frequency upon which to communicate.

Figure 4:
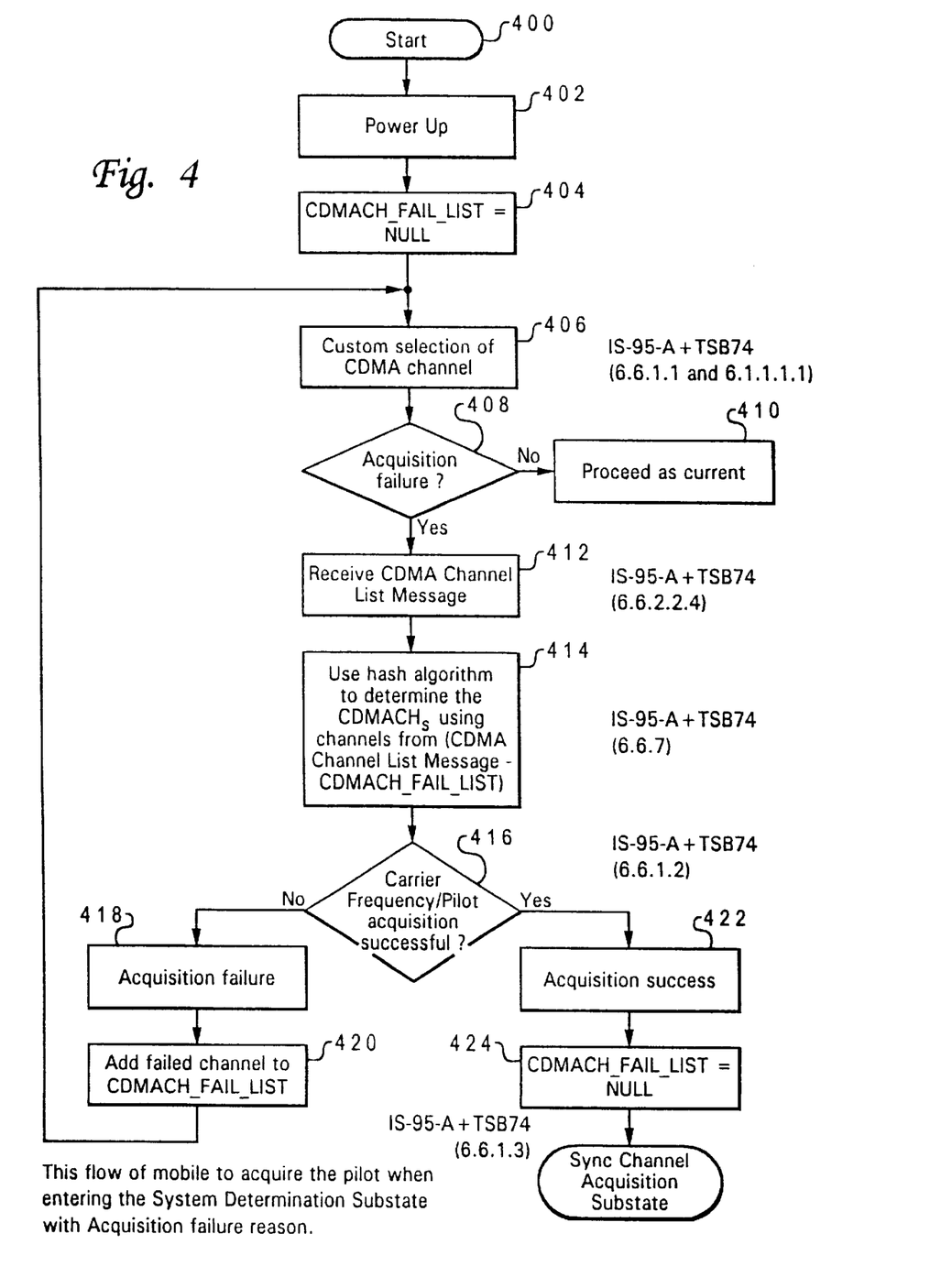
FIG. 4 is a high-level logic flow chart which depicts a method by which another embodiment of the present invention is able to alleviate system failure in an IS-95-A+TSB74 standard system.

Refer now to FIG. 4. FIG. 4 is a high-level logic flow chart which depicts a method by which another embodiment of the present invention is able to alleviate the foregoing described problem of FIG. 2. The highlevel logic flow chart of FIG. 4 can be referenced specifically to the IS-95-A+TSB74 standard via the IS-95-A+TSB74 standard section numbers depicted in FIG. 4 (e.g., 6.1.1, 6.1.1.1.1, 6.6.2.2.4, 6.6.7, 6.6.1.2, and 6.6.1.3). That is, the high-level logic flow chart depicted in FIG. 4 is intended to be used within the context of IS-95-A+TSB74 systems to alleviate the foregoing noted problems extant within the standard.

Method step 400 depicts the start of the process. Method step 402 illustrates the event of "power up," which is essentially the event of turning on or bringing online a mobile subscriber unit. Method step 404 shows the initialization of a list of inoperative CDMA carrier frequencies to be empty; that is, the variable CDMACH_FAIL_LIST is set equal to NULL.

Subsequent to the setting of the list of inoperative CDMA carrier frequencies (e.g., the setting of the variable CDMACH_FAIL_LIST) method step 406 depicts the engagement in the custom selection of a CDMA primary or secondary channel as dictated by IS-95-A+TSB74 sections 6.6.1.1 and section 6.1.1.1.1. Thereafter, method step 408 depicts the determination of whether the custom selection procedure of method step 406 resulted in an acquisition failure. In the event that no acquisition failure occurred, the process proceeds to method step 410 which illustrates that operation is to proceed as normal under the current IS-95-A+TSB74 standard.

In the event that an acquisition failure did occur, the process proceeds to method step 412 which shows the receipt of the list of CDMA carrier frequencies via a CDMA Channel List Message in the fashion dictated by the IS-95-A+TSB74 standard section 6.6.2.2.4. Thereafter, the process proceeds to method step 414 wherein it is depicted that a modified IS-95-A+TSB74 section 6.6.7 hash algorithm is utilized to select a CDMA carrier frequency such that the CDMA carrier frequency selected is not one already noted to be inoperative. How such hash algorithm can be modified to insure that the CDMA carrier frequency selected is not one already noted to be inoperative has been discussed above in reference to method step 310, and such discussion is herein incorporated by reference in its entirety. However, it is to be understood that in the method shown in FIG. 4 the variable CDMACH$_s$ is utilized to indicate the channel selected by the modified hash algorithm and to which the mobile subscriber unit's receiver is thereafter tuned.

Method step 416 illustrates that subsequent to the selection of a CDMA carrier frequency a determination is made as to whether or not the selected CDMA carrier frequency or the "pilot" channel within the selected CDMA carrier frequency can be acquired. In the event that it is determined that the "pilot" channel cannot be acquired, the process proceeds to method step 418 wherein it is shown that the acquisition failure is noted. Subsequently, the process proceeds to method step 420 wherein it is depicted that the CDMA carrier frequency for which CDMA carrier frequency/"pilot" channel acquisition failed is added to the list of failed, or inoperative, CDMA carrier frequencies; that is, variable CDMACH_FAIL_LIST is reset such that the failed, or inoperative, channel is now included in the list of failed channels. Thereafter, the process returns to method step 406 and proceeds from that point, utilizing the adjusted inoperative channel list contained within the variable CDMACH_FAIL_LIST.

In the event that it is determined that the "pilot" channel can be acquired, the process proceeds to method step 422 which illustrates that the acquisition success is noted. Subsequently, the process proceeds to method step 424 which shows that the list of inoperative channels is reset to be empty; that is, the variable CDMACH_FAIL_LIST is reset to be NULL. Thereafter, the process proceeds to the "Sync Channel Acquisition Substate" defined by IS-95-A+TSB74 standard section 6.6.1.3.

It will be understood by those within the art that the process illustrated in FIG. 4 is to be re-engaged in each time the mobile subscriber unit leaves the "Sync Channel Acquisition Substate" and enters a state wherein it is necessary to acquire a new CDMA carrier frequency upon which to communicate.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method for avoiding communication failure, said method comprising the steps of:

detecting acquisition failure of at least one CDMA carrier; and in response to said detecting step, adjusting a channel acquisition procedure by:
substituting a new seed into a pseudo-random number generator utilized to select the CDMA carrier; and
thereafter utilizing the new seed with the pseudo-random number generator, such that said at least one CDMA carrier for which acquisition failed is no longer considered a viable channel.

2. The method of claim 1, wherein said step of detecting further includes the step of storing an identity of the at least one CDMA carrier.

3. The method of claim 1, wherein said step of adjusting channel acquisition procedures further includes the step of removing the at least one CDMA carrier for which acquisition failed from a list of carriers considered active.

4. The method of claim 1, wherein said step of adjusting channel acquisition procedures further includes the steps of:

selecting a new CDMA carrier; and thereafter, if said new CDMA carrier selected is the at least one CDMA carrier for which acquisition failed, substituting another CDMA carrier in place of the new CDMA carrier selected.

5. The method of claim 1, further including the step of selecting the CDMA carrier utilizing a pseudo-random number generator provided in a IS-95-A+TSB74 (1996) standard.

6. The method of claim 1, further including the step of selecting the CDMA carrier utilizing a pseudo-random number generator according to a custom selection process of an ANSI J-STD-008 (1995) standard corrected version.

7. The method of claim 1, wherein said step of detecting at least one CDMA carrier acquisition failure further includes the step of detecting pilot channel acquisition failure.

8. A system for avoiding communication failure, said system comprising:

means for detecting an acquisition failure of at least one CDMA carrier; and means for adjusting a channel acquisition procedure by substituting a new seed into a pseudo-random number generator and thereafter utilizing the new seed with the pseudo-random number generator to select the CDMA carrier, such that said at least one CDMA carrier for which acquisition failed is no longer considered a viable channel.

9. The system of claim 8, wherein said means for detecting further includes means for storing an identity of the at least one CDMA carrier.

10. The system of claim 8, wherein said means for adjusting channel acquisition procedures further includes means for removing the at least one CDMA carrier from a list of carriers considered active.

11. The system of claim 8, wherein said means for adjusting channel acquisition procedures further includes:

means for selecting anew CDMA carrier; and means for thereafter substituting another CDMA carrier in place of said new CDMA carrier selected, if the new CDMA carrier selected is the at least one CDMA carrier for which acquisition failed.

12. The system of claim 8, further including means for selecting a new CDMA carrier utilizing a pseudo-random number generator that includes functional elements defined in a IS-95-A+TSB74 (1996) standard.

13. The system of claim 8, further including means for selecting a new CDMA carrier utilizing a pseudo-random number generator according to a custom selection process of an ANSI J-STD-008 (1995) standard, corrected version.

14. The system of claim 8, wherein said means for detecting at least one CDMA carrier acquisition failure further comprises means for detecting at least one pilot channel acquisition failure.

* * * * *

UNITED STATES PATENT AND TRADEMARK OFFICE
CERTIFICATE OF CORRECTION

PATENT NO. : 6,233,247 B1  
DATED : May 15, 2001  
INVENTOR(S) : Samir Alami et al.

It is certified that error appears in the above-identified patent and that said Letters Patent is hereby corrected as shown below:

<u>Title page,</u>  
Item [75], please change -- Denton -- to Richardson."

Signed and Sealed this

Seventh Day of May 2002

Attest:

JAMES E. ROGAN  
*Attesting Officer*     *Director of the United States Patent and Trademark Office*